Patented Jan. 5, 1937

2,066,584

UNITED STATES PATENT OFFICE 2,066,584

PROCESS OF THE STABILIZATION OF CELLULOSE ESTERS

Otto Sindl, Berlin, Germany

No Drawing. Application December 29, 1932, Serial No. 649,358. In Germany March 24, 1932

9 Claims. (Cl. 260—102)

Cellulose esters which were produced in conjunction with the employment of inorganic acids as catalyzers, frequently contain, in spite of the most careful washing with water, certain quantities of the catalyzer which, though being quite inconsiderable, will suffice to bring about a decomposition of the ester.

In accordance with the present invention it has been rendered possible to stabilize such cellulose esters, by treating them in a swollen state with such liquids or mixtures of liquids, if necessary at an increased temperature and/or under pressure, which are adapted to dissolve inorganic acids or their compounds with degradation products of the cellulose, but not any essential quantities of the ester itself. Such liquids are advantageously employed which themselves are capable of bringing about a swelling of the ester.

In consequence of this treatment the corresponding acid will be separated from its chemical or physical bond with the cellulose and may be wholly eliminated by expelling the liquid or by means of extraction with liquids exerting an identical or similar effect. It may be assumed that, as a result of the treatment, also compounds of the catalyzer with degradation products of the cellulose are dissolved and expelled.

As liquids for a treatment of this nature may be considered, for example, ethyl acetate, amyl acetate or the like, as well as a mixture of such substances with solvents of the ester. Thus, ethyl acetate with or without acetic acid or formic acid, or ethyl acetate with amyl acetate may be used. Up to a certain degree such substances as, for instance, benzene, ethyl ether and the like in the form of a mixture with solvents or swelling media for cellulose esters may be employed.

The process in accordance with the present invention will prove particularly successful in connection with the treatment of such cellulose esters as were produced in the presence of non-solvents, causing them to retain the structure of the starting material, e. g. of the cotton- or woodpulp. With such esters the stabilizing treatment may be immediately coupled with the process of manufacture without the necessity of previously cleaning or drying the ester, e. g. by treating the ester, while still in a swollen state, with the stabilizing liquid, in accordance with the counter-current principle.

If, however, the ester has already been dried, it is obvious, that in the first instance an adequate re-swelling of the former will have to be secured.

In some cases it will prove of advantage to follow up the treatment by means of a suitable organic, swelling liquid, simultaneously dissolving the impurities, prior to or after the drying of the ester thus treated, by a treatment with water, if necessary, with hot water. The water will then be, in contradistinction to the application immediately after the production of the ester, capable of dissolving the last traces of the catalyzer or of the compounds of same.

Example 1

30 kilos of linters are acetylized in the presence of benzene as non-solvent by means of acetic anhydride, and as a catalyst sulphuric acid. The linters, in a swollen state after being treated with glacial acetic acid, are thoroughly rinsed with a 2% solution of concentrated sulphuric acid in glacial acetic acid, being subsequently treated with a mixture of 2 parts of acetic acid anhydride and 3 parts of benzene in accordance with the counter-current principle, after having been left to itself for 6 hours at a temperature of 25° C. Preferably this mixture is always made to contain about 1% of sulphuric acid. After the third flushing with a fresh solution, an acetate is obtained which has wholly retained the fibre structure; it is soluble in methylene chloride and formic acid giving a clear solution. Its content of acetic acid amounts to 59.6% and the content of sulphuric acid to 3%, if a small part is drained off, washed with benzene, glacial acetic acid and afterwards with benzene subsequently evaporating and washing it with hot water. It carbonizes at 170° C. The stabilization in accordance with the invention is effected as follows:

The reaction mass is washed in counter-current with hot benzene-glacial acetic acid (5:1) until the greatest part of the anyhdride has been extracted; subsequently it is heated with glacial acetic acid—benzene (2:8) preferably whilst boiling and washed with the same liquid hot and afterwards with benzene, finally evaporating the benzene. The acetate of the fibrous structure contains now 61.9% of acetic acid and less than .01% of sulphuric acid. It will not turn yellow until a temperature of 250° C. is attained; on attaining a temperature of 270° C. it will turn brown and melt on reaching 295° C., forming a honey-yellow liquid.

Example 2

Linters are acetylated in the presence of ethyl acetate as non-solvent. The reaction mixture is worked up by draining the liquid. The fibre mass will then be heated for 1 hour with a mixture of ethyl acetate and glacial acetic acid 85:15 and the treatment with fresh mixture in countercurrent repeated three times. It is then washed four times in countercurrent with ethyl acetate, evaporated, washed with hot water and dried. Prior to the washing with water a dried sample will only show a slight yellowish coloration upon attaining a temperature of 275°, melting to a liquid of a honey-yellowish hue on reaching a temperature of 295° turning only light brown even on reaching 305°. Evaporating a sample to dryness by means of fuming nitric acid, repeating this twice, absorption with concentrated hydrochloric acid, heating and the addition of $BaCl_2$, does not yield even a trace of a deposit.

*Example 3*

Ordinary tri-acetate which has been precipitated from the primary acetylizing solution, washed with water and dried, is heated for 1 hour in a mixture of ethyl acetate-glacial acetic acid 80:20, after being subjected to cold action for 1 hour; it is subsequently drained, this procedure being repeated three times, whereupon it is washed with ethyl acetate in countercurrent, evaporated and dried. The success is identical with that obtained with the aid of the previously mentioned examples.

Tri-acetates stabilized in accordance with the present invention can be employed for all purposes for which such esters have heretofore been used, whilst no decomposition detrimentally affecting the structures formed therefrom is to be feared, which decomposition hitherto was very much dreaded. After the stabilization in accordance with the present invention, the tri-acetate is also rendered available for other applications. The fibrous acetates obtained in conjunction therewith are easily dissolved in appropriate solvents, as for instance, in formic acid, methylene chloride without and with alcohol, methyl formate and the like and allow of being transformed from these solvents into structures of varying kind in accordance with methods known in themselves, either by allowing the solvent to evaporate or by precipitation in accordance with the wet process. In this way it has been rendered possible to produce artificial threads, films, hollow bodies, closing capsules characterized by an unlimited durability in consequence of the stabilization treatment. Even in cases in which traces of sulphuric acid are found by analysis, the durability of the acetate will yet be unlimited if subjected to ordinary use. The grave changes formerly met with in tri-acetates, were caused by the comparatively large percentage of sulphuric acid contained therein, which the present process renders it possible to eliminate. Even if there should be traces of sulphuric acid left, they will in all probability be truly combined and be incapable of exercising a detrimental effect.

Cellulose which has been esterified to a stage other than that of the tri-ester may also be stabilized in accordance with the present process, for instance, acetates which are soluble in acetone.

It is most advisable to transform the ester prior to or during its production or stabilizing into cakes under pressure, in view of the fact that such cakes may be treated with ease, e. g. by pressing through the corresponding liquids. Upon the conclusion of all these operations, the cakes may be defibred and dried whilst recovering the liquid still adhering thereto.

What I claim is:

1. In the preparation of stabilized cellulose esters by methods wherein sulfuric acid is used as catalyst, the steps which comprise treating such a cellulose ester, containing residues of said sulfuric acid, while in a swelled state, with a mixture of a lower fatty acid and a liquid ester of a lower fatty acid, under conditions producing elimination of said sulfuric acid residues.

2. The process of claim 1 wherein said treatment is conducted in the presence of an inert organic diluent.

3. The process of claim 1 wherein said treatment is conducted under super-atmospheric pressure.

4. The process of claim 1 wherein said treatment is conducted in counter-current.

5. The process of claim 1 wherein said treatment is followed by a treatment with a liquid ester of a lower fatty acid for further removal of said residues.

6. In the process of making cellulose acetate wherein cellulose is treated in an acetylating bath with a reaction liquid, which contains sulfuric acid as catalyst, an acetylating agent and an inert diluent and which is capable of swelling cellulose acetate without dissolving it, followed by separation of the reaction liquid from the swollen ester; the step which comprises treating the swollen ester with ethyl acetate in the presence of acetic acid for elimination of the sulfuric acid retained by said ester.

7. A process as claimed in claim 6 in which the treatment liquid for the cellulose acetate is used at the boiling point thereof.

8. A process as claimed in claim 6 in which the said acetylating bath contains a mixture of acetic anhydride, acetic acid and ethyl acetate.

9. A process of claim 6 wherein said treatment is followed by a treatment with ethyl acetate for further removal of the retained sulfuric acid.

OTTO SINDL.